United States Patent [19]

Funahashi et al.

[11] Patent Number: 4,848,756
[45] Date of Patent: Jul. 18, 1989

[54] FLUID-FILLED CYLINDRICAL ELASTIC MOUNT HAVING A PROTECTIVE MEMBER EXTENDING THROUGH A VOID

[75] Inventors: Yoshiki Funahashi, Iwakura; Masayuki Hibi, Komaki, both of Japan

[73] Assignee: Tokai Rubber Industries, Ltd., Aichi, Japan

[21] Appl. No.: 281,335

[22] Filed: Dec. 8, 1988

[30] Foreign Application Priority Data

Oct. 5, 1987 [JP] Japan ................. 62-251401

[51] Int. Cl.⁴ .................. F16M 5/00; F16M 13/00; F16F 5/00
[52] U.S. Cl. ................... 267/140.1; 248/562; 267/293
[58] Field of Search ............ 267/140.1, 219, 35, 267/113, 281, 282, 293, 141.2–141.5; 248/562, 609, 636, 638; 180/312, 300; 123/192 R, 195 A

[56] References Cited

U.S. PATENT DOCUMENTS 4,139,246  2/1979  Mikoshiba et al. ............. 267/281 X
4,717,111  1/1988  Saito ........................... 267/140.1 X

FOREIGN PATENT DOCUMENTS 2703038  7/1978  Fed. Rep. of Germany ... 267/141.2

Primary Examiner—Robert J. Oberleitner
Attorney, Agent, or Firm—Oliff & Berridge

[57] ABSTRACT

A fluid-filled cylindrical elastic mount including an inner and an outer sleeve disposed in radially spaced-apart relation with each other and attached to one and the other of a load member and a support structure, an elastic body interposed between the inner and outer sleeves for elastically connecting these sleeves and having a pressure-receiving chamber, and a closure member cooperating with the outer sleeve to define a equilibrium chamber within a void formed between the inner and outer sleeves so as to extend in the axial direction of the sleeves. The pressure-receiving and equilibrium chambers are filled with a non-compressible fluid and communicate with each other through a restricted passage. A protective member fixedly provided on the inner sleeve for movement with the inner sleeve is inserted through the void so as to elastically deform the closure member toward the outer sleeve before the elastic mount is attached to the load member. The protective member and the closure member are dimensioned and shaped so as to define therebetween a suitable amount of gap for permitting the closure member to be displaced so as to change the volume of the equilibrium chamber, after the elastic mount is attached to the load member.

10 Claims, 2 Drawing Sheets

FLUID-FILLED CYLINDRICAL ELASTIC MOUNT HAVING A PROTECTIVE MEMBER EXTENDING THROUGH A VOID

BACKGROUND OF THE INVENTION

1. Field of the Invention

The present invention relates generally to a fluid-filled cylindrical elastic mount, such as a cylindrical engine mount for a front-engine front-drive motor vehicle, and more particularly to improvements in the durability of such a fluid-filled cylindrical elastic mount.

2. Discussion of the Prior Art

There is known a fluid-filled cylindrical elastic mount for effectively damping radially applied vibrations in a certain frequency range, based on resonance of a mass of a non-compressible fluid existing in a restricted passage which communicates with a plurality of fluid chambers defined between an inner and an outer sleeve which are elastically connected to each other by an elastic body interposed therebetween. The restricted passage is tuned to the desired frequency range of the vibrations to be damped. For instance, such a fluid-filled cylindrical elastic mount is used for flexibly mounting a power unit (including an engine and a transmission) on a front-engine front-drive vehicle, so that the body of the vehicle is isolated from vibrations of the power unit.

In such a known fluid-filled cylindrical elastic mount, the inner and outer sleeves are elastically connected to each other by a generally cylindrical elastic body which has a plurality of fluid chambers formed therein in fluid communication with each other through a restricted passage. In this arrangement, the elastic body is inevitably subjected to a tensile force after the elastic mount is installed in its operating position, such that the weight of the power unit or other member to be supported by the relevant elastic mount acts on the elastic body. Therefore, the elastic body of the known elastic mount tends to suffer from relatively low durability, resulting in accordingly short life expectancy of the elastic mount. This means that the known elastic mount discussed above is not suitable as a mounting device which is permanently subjected to the weight of a certain load such as the vehicle power unit indicated above.

There has recently been proposed a fluid-filled cylindrical elastic mount for elastically or flexibly mounting a load member on a support structure, including (a) an inner sleeve attached to one of the load member and the support structure, (b) an outer sleeve attached to the other of the load member and the support structure, and disposed radially outwardly of the inner sleeve with a certain radial spacing therebetween, (c) an elastic body interposed between the inner and outer sleeves for elastically connecting these sleeves, and having at least one pressure-receiving chamber formed therein, (d) means for defining a void formed between the inner and outer sleeves so as to extend in the axial direction of the sleeves, through a portion of the elastic mount not occupied by the elastic body, (e) a closure member having a flexible portion which cooperates with the outer sleeve to define a variable-volume equilibrium chamber within the void, (f) a non-compressible fluid which fills the equilibrium chamber and the pressure-receiving chamber, and (g) means for defining a restricted passage which communicates with each pressure-receiving chamber and the equilibrium chamber.

In the fluid-filled cylindrical elastic mount constructed as described above, the equilibrium chamber communicating with the pressure-receiving chamber through the restricted passage is defined between the closure member and the outer sleeve. This means that the elastic body need not be a cylindrical body, and can therefore be protected from an excessive tensile force due to the weight of the load member, even where the elastic mount is used such that the weight of the load member permanently acts on the elastic body. In other words, the durability of the elastic body and the life expectancy of the elastic mount will not be seriously deteriorated even where the elastic mount is used in such condition.

In assembling the fluid-filled cylindrical elastic mount of the type indicated above, the outer sleeve is usually fitted on the sub-assembly of the elastic body and the closure member, within a mass of the selected non-compressible fluid, so that the pressure-receiving and equilibrium chambers are filled with the non-compressible fluid in the assembling process. The thus assembled elastic mount is subjected, at its outer sleeve, to a drawing operation to give the elastic mount a suitable amount of radially inward pre-compression, and to establish fluid tightness of the pressure-receiving and equilibrium chambers. This drawing of the outer sleeve inevitably causes a relatively high fluid pressure in the equilibrium chamber, which leads to reduced durability of the flexible portion of the closure member.

Described in more detail, the relatively high pressure in the equilibrium chamber in the elastic mount as produced causes a considerably large tensile force permanently acting on the closure member, due to an increase in the fluid pressure in the equilibrium chamber when the elastic mount is installed with the weight of the load member acting on the elastic mount. The pressure in the equilibrium chamber is further increased when an excessively high vibrational load is applied to the elastic mount. The durability of the flexible portion of the closure member defining the equilibrium chamber is necessarily reduced with an increase in the tensile force acting on the closure member.

SUMMARY OF THE INVENTION

It is therefore an object of the present invention to provide a fluid-filled cylindrical elastic mount which permanently bears the weight of a load member and which provides improved durability.

The above object may be accomplished according to the principle of the present invention, which provides a fluid-filled cylindrical elastic mount for flexibly connecting a load member to a support structure, comprising: (a) an inner sleeve attached to one of the load member and the support structure; (b) an outer sleeve attached to the other of the load member and the support structure, and disposed radially outwardly of the inner sleeve with a predetermined radial spacing therebetween; (c) an elastic body interposed between the inner and outer sleeves for elastically connecting the inner and outer sleeves, the elastic body having at least one pressure-receiving chamber formed therein; (d) means for defining a void formed between the inner and outer sleeves so as to extend in the axial direction of the sleeves, through a portion of the elastic mount not occupied by the elastic body; (e) a closure member having a flexible portion which cooperates with the outer sleeve to define a variable-volume equilibrium chamber within the void; (f) a non-compressible fluid which fills the equilibrium chamber and the pressure-receiving chamber; (g) means for defining a restricted passage which communicates with the at least one pressure-receiving chamber and the equilibrium chamber; and (h) a protective member fixedly provided on the inner sleeve for movement with the inner sleeve. The protective member is inserted through the void so as to elastically deform the closure member toward the outer sleeve before the elastic mount is attached to the load member. The protective member and the closure member are dimensioned and shaped so as to define therebetween a predetermined amount of gap for permitting the flexible portion of the closure member to be displaced so as to change a volume of the equilibrium chamber, after the elastic mount is attached to the load member.

While the fluid-filled cylindrical elastic mount of the present invention constructed as described above is installed in position for flexible connection of the load member to the support structure, the gap is formed between the protective member and the closure member, so that the flexible portion of the closure member defining the equilibrium chamber may be elastically deformed or displaced without being restricted by the protective member. Accordingly, the volume of the equilibrium chamber may be changed with the non-compressible fluid flowing into and from the equilibrium chamber through the restricted passage, when a vibrational load is applied to the elastic mount. As a result, the vibrations of a frequency range to which the restricted passage is tuned may be effectively damped, based on resonance of the compressible fluid mass which flows through the restricted passage, as in a conventional fluid-filled cylindrical elastic mount.

It is noted that before the elastic mount is attached to the load member, i.e., when the elastic mount is assembled, the closure member is elastically displaced toward the outer sleeve by the protective member which is inserted into the void formed so as to extend in the axial direction of the elastic mount Consequently, the total volume of the pressure-receiving chamber and the equilibrium chamber is reduced by an amount corresponding to the amount of displacement of the closure member, than that in the conventional fluid-filled cylindrical elastic mount. Therefore, the fluid pressure in the equilibrium chamber after the outer sleeve is subjected to a drawing operation for establishing the fluid tightness of the pressure-receiving and equilibrium chambers and before the elastic mount is attached to the load member can be made accordingly lower than that in the conventional elastic mount without the protective member. This means reduction in the fluid pressure in the equilibrium chamber after the elastic mount is attached to the load member and the support structure such that the protective member is spaced apart from the closure member due to the movement of the protective member with the inner sleeve. Further, the fluid pressure in the equilibrium chamber upon application of a vibrational load to the elastic mount is also comparatively low due to the reduced volume of the non-compressible fluid. Thus, the tensile force applied to the flexible portion of the closure member due to the pressure in the equilibrium chamber is reduced, whereby the durability of the closure member and therefore the life expectancy of the elastic mount are significantly improved The present fluid-filled cylindrical elastic mount enjoys the improved durability or life expectancy, while assuring excellent vibration damping or isolating capabilities as provided by the conventional elastic mount.

Further, the protective member inserted through the void also serves as a stop for preventing an excessive amount of elastic deformation of the elastic body due to relative displacement between the inner and outer sleeves This stop function can be adjusted as desired, by suitably determining the thickness and material of the protective member. Since the required volume of the non-compressible fluid filling the pressure-receiving and equilibrium chambers is reduced by an amount equal to the volume of the protective member inserted in the void, the cost of the fluid-filled elastic mount is accordingly lowered.

In one form of the invention, the void has a substantially arcuate cross sectional shape as seen in a plane perpendicular to an axis of the elastic mount, while the protective member has a cross sectional shape substantially similar to the substantially arcuate cross sectional shape of the void.

In another form of the invention, the elastic mount further comprises a support member fixed to the inner sleeve, and the protective member are fixed to the support member so as to extend parallel to an axis of the elastic mount. The support member may consist of a stop plate for protecting the outer sleeve from abutting contact with a mounting bracket for attaching the elastic mount to one of the load member and the support structure The protective member may be formed as an integral part of the support member, or as a separate member fixed to the support member. Preferably, the axial length of the inner sleeve is larger than the corresponding length of the elastic body, so that an axial end portion projects from a corresponding axial end of the elastic body, and the support member is fixed to the axial end portion of the inner sleeve.

In a further form of the invention, the elastic body has a portion defining a second void formed therethrough in an axial direction of the elastic mount, in addition to the above-indicated void provided as a first void. The first and second voids are positioned on diametrically opposite sides of the inner sleeve as viewed in a radial direction of the elastic mount in which a weight of the load member acts on the elastic mount.

In a still further form of the invention, the elastic mount has a first and a second pressure-receiving chamber which communicates with each other through the restricted passage. The second pressure-receiving chamber may be positioned between the first pressure-receiving chamber and the inner sleeve. In this case, a wing member may be disposed within the second pressure-receiving chamber so as to substantially divide the second pressure-receiving chamber into two sections. The periphery of the wing member cooperates with the inner circumferential surface of the outer sleeve to define a restricted portion through which the two sections of the second pressure-receiving chamber communicates with each other.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
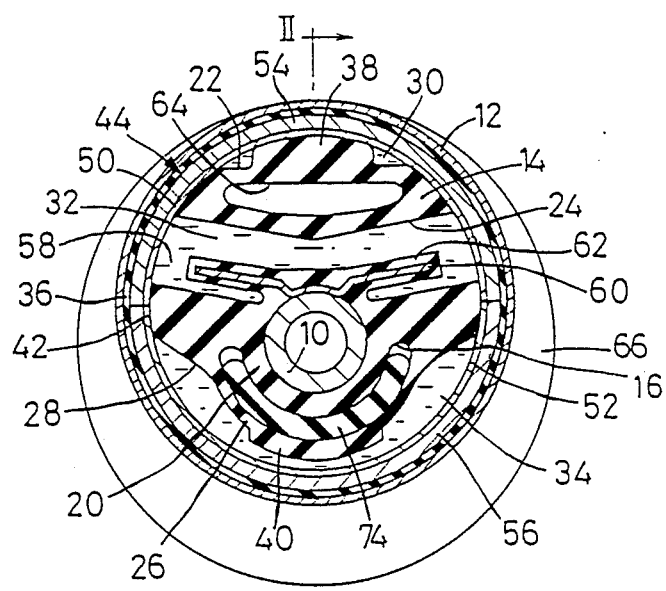
FIG. 1 is an elevational view in transverse cross section (taken along line I—I of FIG. 2) of one embodiment of a fluid-filled cylindrical elastic mount of the present invention, in the form of an engine mount for a front-engine front-drive motor vehicle, before the engine mount is installed on the vehicle to mount a power unit thereon.
Figure 2:
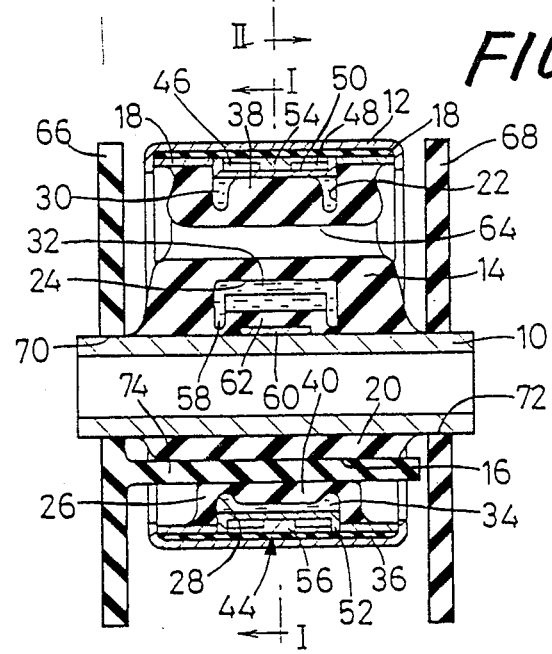
FIG. 2 is an elevational view in axial cross section of the elastic mount of FIG. 1, taken along line II—II of FIG. 1.

Referring to FIGS. 1 and 2, there is shown the presently preferred embodiment of the fluid-filled cylindrical elastic mount of the present invention, in the form of a cylindrical engine mount for a front-engine front-drive motor vehicle (hereinafter referred to as "FF vehicle" when appropriate). It will be understood, however, that the elastic mount according to the principle of the invention may be used for other applications or purposes.

In FIGS. 1 and 2, reference numeral 10 denotes an inner metal sleeve made of a metallic material and having a relatively large cylindrical wall thickness, while reference numeral 12 denotes an outer metal sleeve also made of a metallic material and having a relatively small cylindrical wall thickness. The outer metal sleeve 12 is disposed outwardly of the inner metal sleeve 10 such that the two sleeves 10, 12 are eccentric with respect to each other by a predetermined distance in a diametric direction of the engine mount, before the engine mount is placed in position for mounting a power unit of the FF vehicle. These inner and outer metal sleeves 10, 12 are elastically connected to each other by a generally semi-cylindrical elastic body 14 of a rubber material formed therebetween.

As indicated above, the instant engine mount is used to mount the power unit on the body of the vehicle, such that the inner metal sleeve 10 is attached to one of the vehicle body and the power unit, while the outer metal sleeve 12 is attached to the other of the vehicle body and power unit, so as to damp or isolate input vibrations of the power unit with respect to the vehicle body.

Figure 5:
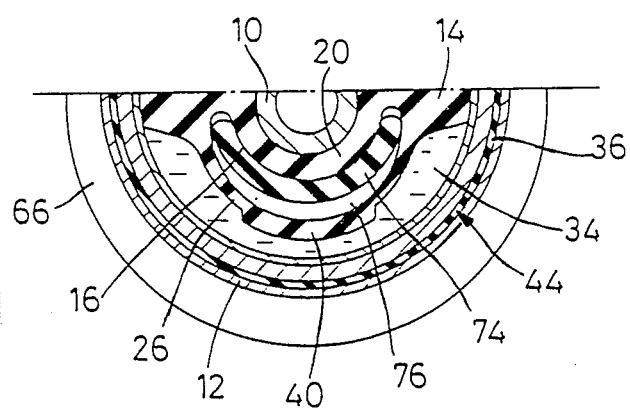
FIG. 5 is a fragmentary elevational view in cross section of the engine mount, when the power unit is mounted on the vehicle via the engine mount.

A substantial portion of the elastic body 14 is interposed on one of opposite diametric sides of the inner metal sleeve 10 on which the distance between the center of the sleeve 10 and the circumference of the outer metal sleeve 12 is larger than that on the other side, as viewed in the direction in which the centers of the inner and outer metal sleeves 10, 12 are offset from each other. On the other diametric side of the inner metal sleeve 10, there is formed a first void in the form of an arcuate void 16 which extends over a substantially entire length of the elastic body 14 in the axial direction of the engine mount. As shown in FIG. 1, the arcuate void 16 has a substantially arcuate shape as viewed in transverse cross section of the engine mount. The elastic body 14 is adapted to be elastically inwardly compressed between the inner and outer metal sleeves 10, 12 in a load-receiving direction of the engine mount or in the direction of offset of the two sleeves, so that the two sleeves 10, 12 are held in substantially concentric or coaxial relationship with each other, as indicated in FIG. 5, with the weight of the power unit applied to the engine mount, that is, when the engine mount is installed in place on the vehicle for flexible connection of the power unit to the vehicle body.

The elastic body 14 is secured to the inner metal sleeve 10 in a vulcanization process in a suitable mold. Further, a pair of sealing sleeves 18, 18 are secured, also in the vulcanization process, to the outer circumferential surface of the elastic body 14, such that the two sleeves 18, 18 are fitted on the opposite axial end portions of the elastic body 14. The outer metal sleeve 12 is fluid tightly fitted on the sealing sleeves 18 via a circumferential sealing rubber layer 36 formed therebetween. Thus, the elastic body 14 is formed between the inner and outer metal sleeves 10, 12.

As indicated in FIGS. 1 and 2, the elastic body 14 has an integrally formed arcuate rubber layer 20 which partially defines the arcuate first void 16. The rubber layer 20 is formed substantially along a part of the circumference of the inner metal sleeve 10 on the side of the arcuate void 16. As is apparent from FIG. 2, the axial length of the inner metal sleeve 10 is slightly greater than those of the outer metal sleeve 12 and elastic body 14, so that the axial end portions of the inner metal sleeve 10 extend from the ends of the outer metal sleeve 12 and elastic body 14, by suitable lengths.

Figure 3:
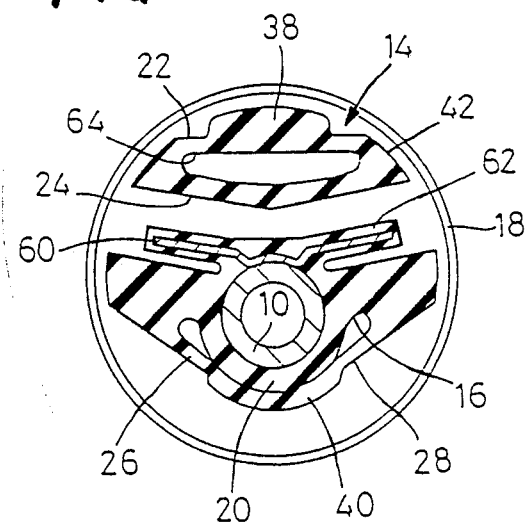
FIG. 3 is a cross sectional view corresponding to that of FIG. 1, showing an intermediate product prepared by vulcanization of an elastic rubber body with an inner metal sleeve, during manufacture of the engine mount.

As shown in FIG. 3, the elastic body 14 has a pocket 22 open in a portion of the outer circumferential surface which is the most distant from the axis of the inner metal sleeve 10. The elastic body 14 also has a cavity 24 which is formed between the pocket 22 and the inner metal sleeve 10, so as to extend perpendicularly to the load-receiving direction of the engine mount (the direction in which the elastic body 14 is compressed by the weight of the power unit). The cavity 24 is open to a space defined between the two sealing sleeves 18, 18, and has a substantially rectangular cross sectional shape. A flexible closure 26 is formed integrally with the elastic member 14, so as to form a recess 28 within a portion of the space between the two sealing sleeves 18 which is adjacent to the arcuate void 16. The flexible closure 26 cooperates with the arcuate rubber layer 20 to define the arcuate void 16.

The openings of the pocket 22, cavity 24 and recess 28 are fluid tightly closed by the outer metal sleeve 12 via the sealing rubber layer 36, whereby a first pressure-receiving chamber 30, a second pressure-receiving chamber 32, and an equilibrium chamber 34 are formed, respectively, as indicated in FIGS. 1 and 2. These three chambers 30, 32, 34 are filled with a suitable non-compressible fluid such as water, polyalkylene glycol or silicone oil.

The circumferential sealing rubber layer 36 referred to above is secured to the inner circumferential surface of the outer metal sleeve 12 by vulcanization, such that the sealing rubber layer 36 is squeezed between the metal sleeve 12 and the sealing sleeves 18, so as to establish the fluid tightness of the pressure-receiving chambers 30, 32 and equilibrium chamber 34. Reference numerals 38 and 40 denote a first and a second rubber block which are formed integrally with the elastic body 14 and the flexible closure 26, respectively, such that the first rubber block 38 extends into the first pressure-receiving chamber 30 while the second rubber block 40 extends into the equilibrium chamber 34. These rubber blocks 38, 40 function as stops for limiting a relative displacement of the inner and outer metal sleeves 10, 12, in the load-receiving direction, when the inner metal sleeve 10 is moved in the downward direction as seen in FIGS. 1 and 2, which causes the elastic body 14 to be elongated in the load-receiving direction. In the present embodiment, the elastic body 14, flexible closure 26, and first and second rubber blocks 38, 40 constitute a substantially cylindrical elastic member interposed between the inner and outer metal sleeves 10, 12. Further, the flexible closure 26 with the integrally formed rubber block 40 partially defines the equilibrium chamber 34. The flexible closure 26 is formed such that the rubber block 40 is in slightly pressed contact with the surface of the rubber layer 20 which partially defines the arcuate first void 16, as indicated in FIG. 3, before the engine mount including the intermediate product of FIG. 3 is assembled as indicated in FIG. 2.

The elastic body 14 further has a circumferential groove 42 formed in its outer circumferential surface such that the groove 42 is open to the space formed between the two sealing sleeves 18, 18. This circumferential groove 42 communicates with the circumferential ends of the recess 28 in the flexible closure 26. In the circumferential groove 42, there is accommodated a cylindrical orifice-defining mechanism 44 which consists of a pair of first semi-cylindrical members 50, 52, and a pair of second semi-cylindrical members 54, 56 positioned in the first semi-cylindrical members 50, 52, respectively. The cylindrical orifice-defining mechanism 44 is held in position while being sandwiched between the two sealing sleeves 18, 18 in the axial direction of the engine mount. The first and second semi-cylindrical members 50, 52, 54, 56 define a relatively short annular first restricted passage 46, and a relatively long annular second restricted passage 48. The first and second pressure-receiving chambers 30, 32 are held in fluid communication with each other through the first restricted passage 46, while the first pressure-receiving chamber 30 and the equilibrium chamber 34 are held in fluid communication with each other through the second restricted passage 48. Hence, the three chambers 30, 32, 34 are held in communication with each other through the two restricted passages 46, 48.

Described more particularly, when there arises pressure differences between the pressure-receiving chambers 30, 32 and between the pressure-receiving chamber 30 and the equilibrium chamber 34, the non-compressible fluid is forced to flow between the chambers 30, 32 and between the chambers 30, 34, through the first and second restricted passages 46, 48. As a result, the vibrations of a frequency range to which the first restricted passage 46 is adjusted or tuned can be effectively damped or isolated based on resonance of the fluid masses in the pressure-receiving chambers 30, 32 and restricted passage 46, while the vibrations of a frequency range to which the second restricted passage 46 is tuned can be effectively damped or isolated based on resonance of the fluid masses in the chambers 30, 34 and restricted passage 48.

In the present engine mount, the frequency range of the vibrations to which the second restricted passage 48 is tuned is comparatively low, while the frequency range to which the first restricted passage 46 is tuned is intermediate. Namely, the low-frequency vibrations such as engine shake can be suitably damped based on the resonance of the fluid mass flowing through the second restricted passage 48, while the intermediate-frequency vibrations such as booming noises can be suitably damped based on the resonance of the fluid mass flowing through the first restricted passage 4.

The inner metal sleeve 10 is provided with a wing member 60 secured thereto so as to almost divide the second pressure-receiving chamber 32 into two sections such that the two sections are spaced from each other in the load-receiving direction of the engine mount, as shown in FIGS. 1 and 2. The wing member 60 is dimensioned and positioned such that a generally annular restricted portion 58 is formed between the periphery of the wing member 60 and the inner surface of the orifice-defining mechanism 42 (first semi-cylindrical member 50), so that the two sections of the second pressure-receiving chamber 32 communicate with each other through the annular restricted portion 58. When the inner and outer metal sleeves 10, 12 are displaced relative to each other due to vibrations applied thereto in the load-receiving direction of the engine mount (in the direction of offset of the two sleeves 10, 12), the non-compressible fluid is forced to flow through the restricted portion 58 of the second pressure-receiving chamber 32 in the load-receiving direction, whereby conducted engine noises and other high-frequency vibrations to which the restricted portion 58 is tuned can be effectively isolated based on resonance of the fluid masses which flow through the restricted portion 58. The wing member 60, which is made of a relatively rigid material, is covered by a covering layer 62, as shown in FIG. 1. This covering layer 62 is formed as an integral part of the elastic body 14, whereby the wing member 60 is secured to the inner metal sleeve 10.

As depicted in FIGS. 1 and 2, the elastic body 14 also has a generally flat second void 64 formed in the axial direction of the engine mount, through a radially outer portion thereof. More specifically, the second void 64 is formed through a portion of the elastic body 14 which is located between the first and second pressure-receiving chambers 30, 32, as viewed in the load-receiving direction. This second void 64 is dimensioned and shaped so that the void 64 substantially disappears due to elastic deformation or compression of the elastic body 14 which occurs due to the weight of the power unit when the power unit of the vehicle is installed with the outer metal sleeve 12 attached to the power unit such that the engine mount is circumferentially oriented as indicated in FIG. 1. The provision of this second void 64 functions to avoid an excessive amount of compressive strain of the elastic body 14 which would otherwise occur at the axial end portions which define the axial ends of the second pressure-receiving chamber 32. Accordingly, the second void 64 contributes to increased durability of the elastic body 14.

Figure 4:
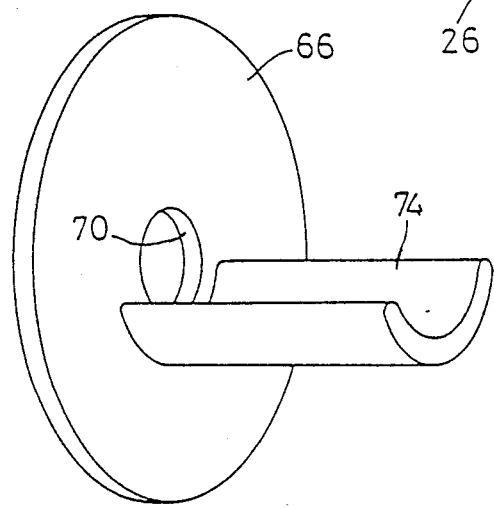
FIG. 4 is a perspective view illustrating a stop plate formed with an arcuate extension that is to be inserted into the rubber body of the engine mount.

The inner metal sleeve 10 is provided with a pair of annular stop or support plates 66, 68 fixedly mounted on the opposite end portions thereof which projects from the opposite end faces of the elastic body 14. These stop plates 66, 68 are formed of an elastic material such as rubber or urethane, and are adapted to prevent the axial ends of the outer metal sleeve 12 from directly abutting on a mounting bracket (not shown) secured to the vehicle body or power unit. The stop plates 66, 68 have an outside diameter larger than that of the outer metal sleeve 12, and respective center holes 70, 72 which fixedly engage the axial end portions of the inner metal sleeve 10. One of the two stop plates 66, 68, i.e., the stop plate 66 has an arcuate extension 74 integrally formed along a part of the circumference of the center hole 70, as indicated in Fig. 4, so as to extend through the arcuate first void 16, as shown in FIGS. 1 and 2. That is, the arcuate extension 74 has a transverse cross sectional shape similar to that of the arcuate void 16, as indicated in FIG. 1. The length of the arcuate extension 74 is determined so that the free end of the extension 74 slightly protrudes from the corresponding end of the arcuate first void 16.

To assemble the instant fluid-filled cylindrical engine mount, the orifice-defining mechanism 44 is positioned in place in the circumferential groove 42 so as to define the first pressure-receiving chamber 30, equilibrium chamber 34 and first and second restricted passages 46, 48, while the intermediate product of FIG. 3 is immersed in a mass of the selected non-compressible fluid. Further, the outer metal sleeve 12 with the sealing rubber layer 36 is fitted on the intermediate product of FIG. 3 while immersed in the mass of the fluid, such that the rubber layer 36 is in pressed contact with the two sealing sleeves 18, 18. Subsequently, the outer metal sleeve 12 is subjected to a suitable drawing operation to radially inwardly pre-compress the elastic body 14, by using eight drawing dies disposed around the sleeve 12, for example. Further, the axial end portions of the outer metal sleeve 12 are calked against the corresponding ends of the elastic body 14.

Thus, the pressure-receiving chambers 30, 32 and the equilibrium chamber 34 are fluid tightly defined, and are filled with the non-compressible fluid in the assembling process of the engine mount within the fluid mass. However, the drawing operation on the outer metal sleeve 12 to pre-compress the elastic body 14 after the assembling of the engine mount results in a relatively high pressure in the equilibrium chamber 34, which may cause an excessive amount of increase of the pressure in the equilibrium chamber 34 when the engine mount in service under the weight of the power unit receives a relatively large vibrational load. In this case, the flexible closure 26 is subject to an extremely large tensile force, and the durability or life expectancy of the flexible closure 26 is accordingly reduced.

In the light of the above drawback, the stop plate 66 having the arcuate extension 74 is secured to the inner metal sleeve 10 such that the arcuate extension 74 is forced into the arcuate void 16 in the elastic member (14, 26, 38, 40) of the intermediate product of FIG. 3, before the outer metal sleeve 12 is fitted on the intermediate product. Consequently, the flexible closure 26 is deformed in the radially outward direction away from the rubber layer 20, by an amount depending upon the thickness of the arcuate extension 74. Then, the outer metal sleeve 12 is fitted on the intermediate product of FIG. 3, and the other stop plate 68 is secured to the inner metal sleeve 10.

When the power unit is installed on the vehicle body via the instant engine mount, with the outer metal sleeve 12 attached to the power unit, the inner metal sleeve 10 and the arcuate extension 74 (stop plate 66) are displaced relative to the outer metal sleeve 12, whereby the arcuate extension 74 is displaced away from the flexible closure 26 with the second rubber block 40, so as to create a crescent gap 76 as indicated in FIG. 5. Namely, the arcuate extension 74 and the flexible closure 26 are dimensioned and shaped so as to provide the gap 76. This gap permits the flexible closure 26 to be elastically deformed due to an increase in the pressure in the equilibrium chamber 34 during operation of the engine mount. The thickness of the arcuate extension 74 of the stop plate 66 is determined so that the gap 76 has a suitable volume necessary to give the engine mount the desired vibration damping or isolating characteristics.

In the fluid-filled cylindrical elastic engine mount constructed as described above, the outer metal sleeve 12 is fitted on the intermediate product of FIG. 3 after the stop plate 66 is secured to the inner metal sleeve 10 so as to insert the arcuate extension 74 into the arcuate void 16. Accordingly, the total volume of the three chambers 30, 32, 34 is reduced by an amount equal to an amount of volumetric reduction of the equilibrium chamber 34 which is caused by the deformation or displacement of the flexible closure 26 into the equilibrium chamber 34 upon insertion of the arcuate extension 74 into the arcuate void 16. In other words, the total volume of the non-compressible fluid which fills the three chambers 30, 32, 34 and the restricted passages 46, 48 is accordingly reduced Therefore, an excessive increase in the pressure of the fluid in the equilibrium chamber 34 can be effectively avoided even when the fluid is forced to flow from the first and second pressure-receiving chambers 30, 32 into the equilibrium chamber 34 when the elastic body 14 is inwardly compressed due to the weight of the power unit upon installation of the power unit on the vehicle body via the instant engine mount such that the inner and outer sleeves 10, 12 maintain a substantially concentric or coaxial relationship with each other, as shown in FIG. 5.

Therefore, in operation of the instant engine mount, an excessive increase in the fluid pressure in the equilibrium chamber 34 can be avoided even when an excessive vibrational load is applied to the engine mount. Thus, the provision of the arcuate extension 74 inserted into the arcuate void 16 during assembling of the engine mount prevents otherwise possible reduction in the durability of the flexible closure 26 due to an excessive amount of tensile force applied thereto. It follows from the above description that the arcuate extension 74 formed integrally with the stop plate 66 serves as a protective member for protecting the flexible closure 26 (part of the elastic member 14, 20, 26, 38, 40) against excessive deformation due to an excessive pressure increase in the equilibrium chamber 34.

Further, the gap 76 formed between the arcuate extension 74 and the flexible closure 26 permits the flexible closure 26 to be elastically deformed, thereby permitting the volume of the equilibrium chamber 34 to be changed when the fluid is forced to flow between the pressure-receiving chambers 30, 32 and the equilibrium chamber 34 through the first and second restricted passages 46, 48, whereby the vibrations of the frequency ranges to which the restricted passages 46, 48 are tuned can be excellently damped or isolated, as in a conventional fluid-filled elastic engine mount.

In addition, the arcuate extension 74 of the stop plate 66 and the second rubber block 40 of the flexible closure 26 cooperates with the semi-cylindrical members 52, to serve as a stop for preventing an excessive amount of elongation of the elastic body 14 in the load-receiving direction of the engine mount, as is apparent from FIG. 1. The desired spring characteristic or vibration damping characteristic of the elastic body 14 may be easily determined by selecting the thickness of the arcuate extension 74, without changing the design of the intermediate product of FIG. 3. In other words, the maximum permissible amount of elongation of the elastic body 14, which determines the end of the linear stress-strain curve (linear relationship between the load applied to the engine mount, and the amount of deformation of the elastic body 14), can be easily changed by changing the thickness of the arcuate extension 74.

As indicated above, the provision of the arcuate extension 74 contributes to reduction in the amount of the non-compressible fluid required to fill the chambers 30, 32, 34, which lowers the cost of the engine mount.

While the present invention has been described in its presently preferred embodiment, for illustrative purpose only, it is to be understood that the invention is not limited to the details of the illustrated embodiment.

In the illustrated embodiment, the protective member for protecting the flexible closure 26 from excessive deformation is provided in the form of the extension 74 which is formed as an integral part of the stop plate 66 which is provided for preventing the outer metal sleeve 12 from abutting on the mounting bracket and is secured to the inner metal sleeve 10 so that the extension 74 is moved with the inner metal sleeve 10. However, the relevant protective member may be secured to the inner metal sleeve 10 by means of a suitable holder or support member which has a smaller diameter than the outer metal sleeve 12 and which does not function as a stop. In this case, the relevant protective member and the holder or support member may be integrally formed of a suitable resin, metal or other rigid material. Where the protective member is formed of such a rigid material, rather than the rubbery material or urethane resin of which the arcuate extension 74 is made, the protective member may provide more excellent stop function for the elastic body 14.

It will be obvious that the protective member and the holder or support member indicated above may be separate members made of different materials. Where the holder or support member is made of an elastic material, the protective member may be supported at its opposite ends by the support member. In other words, the two support members may be used to secure the protective member to the inner metal sleeve 10.

While the outer metal sleeve 12 of the illustrated cylindrical engine mount is coated at its inner surface with the sealing rubber layer 36 in pressed contact with the sealing sleeves 18, 18, such a sealing rubber layer may be provided on the outer surfaces of the sealing sleeves 18, 18. Further, the two sealing sleeves 18, 18 may be replaced by a single cylindrical sealing sleeve which has a suitable window or opening.

Although the illustrated embodiment has the two pressure-receiving chambers 30, 32 formed in the elastic body 14, the elastic body 14 may have only one pressure-receiving chamber.

It will be understood that the present invention may be embodied with various other alterations, modifications and improvements, which may occur to those skilled in the art, in the light of the foregoing disclosure, without departing from the spirit and scope of the invention defined in the following claims.

What is claimed is:

1. A fluid-filled cylindrical elastic mount for flexibly connecting a load member to a support structure, comprising:
   an inner sleeve attached to one of said load member and said support structure;
   an outer sleeve attached to the other of said load member and said support structure, and disposed radially outwardly of said inner sleeve with a predetermined radial spacing therebetween;
   an elastic body interposed between said inner and outer sleeves for elastically connecting said inner and outer sleeves, said elastic body having at least one pressure-receiving chamber formed therein;
   means for defining a void formed between said inner and outer sleeves so as to extend in said axial direction of said sleeves;
   a closure member having a flexible portion which cooperates with said outer sleeve to define a variable-volume equilibrium chamber and said void;
   a non-compressible fluid which fills said equilibrium chamber and said pressure-receiving chamber;
   means for defining a restricted passage which communicates with said at least one pressure-receiving chamber and said equilibrium chamber; and
   a protective member fixedly provided on said inner sleeve for movement with said inner sleeve, said protective member being inserted through said void so as to elastically deform said closure member toward said outer sleeve before the elastic mount is attached to said load member, said protective member and said closure member being dimensioned and shaped so as to define therebetween a predetermined amount of gap for permitting said flexible portion of said closure member to be displaced so as to change a volume of said equilibrium chamber, after the elastic mount is attached to said load member.

2. A fluid-filled cylindrical elastic mount according to claim 1, wherein said void has a substantially arcuate cross sectional shape as seen in a plane perpendicular to an axis of the elastic mount, while said protective member has a cross sectional shape substantially similar to said substantially arcuate cross sectional shape of said void.

3. A fluid-filled cylindrical elastic mount according to claim 1, further comprising a support member fixed to said inner sleeve, said protective member being fixed to said support member so as to extend parallel to an axis of the elastic mount.

4. A fluid-filled cylindrical elastic mount according to claim 3, wherein said support member consists of a stop plate for protecting said outer sleeve from abutting contact with a mounting bracket for attaching the elastic mount to one of said load member and said support structure.

5. A fluid-filled cylindrical elastic mount according to claim 3, wherein said protective member is formed as an integral part of said support member.

6. A fluid-filled cylindrical elastic mount according to claim 3, wherein said inner sleeve has an axial length larger than a corresponding length of said elastic body and an axial end portion which projects from a corresponding axial end of said elastic body, said support member being fixed to said axial end portion of said inner sleeve.

7. A fluid-filled cylindrical elastic mount according to claim 1, wherein said elastic body has a portion defining a second void formed therethrough in an axial direction of the elastic mount, the voids being positioned on diametrically opposite sides of said inner sleeve as viewed in a radial direction of the elastic mount in which a weight of said load member acts on the elastic mount.

8. A fluid-filled cylindrical elastic mount according to claim 1, wherein said at least one pressure-receiving chamber consists of a first and a second pressure-receiving chamber which communicates with each other through said restricted passage.

9. A fluid-filled cylindrical elastic mount according to claim 8, wherein said second pressure-receiving chamber is positioned between said first pressure-receiving chamber and said inner sleeve.

10. A fluid-filled cylindrical elastic mount according to claim 9, further comprising a wing member disposed within said second pressure-receiving chamber so as to substantially divide said second pressure-receiving chamber into two sections, an outer periphery of said wing member cooperating with an inner circumferential surface of said outer sleeve to define a restricted portion through which said two sections of the second pressure-receiving chamber communicates with each other.

* * * * *